United States Patent
Leyonhjelm et al.

(10) Patent No.: US 6,502,840 B1
(45) Date of Patent: Jan. 7, 2003

(54) SUSPENDED AXLE WITH SIDE AND OSCILLATION CONTROL LINKAGE

(75) Inventors: Jeffery Michael Leyonhjelm, Penshurst (AU); Lyal Douglas Allen, Hamilton (AU); James Arthur Nagorcka, Tarrington (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/976,913

(22) Filed: Oct. 12, 2001

(51) Int. Cl.⁷ .................................................. B60G 9/02
(52) U.S. Cl. ........................ 280/124.111; 280/124.113; 180/900; 180/905
(58) Field of Search .................. 280/124.111, 124.112, 280/124.113, 124.116, 755; 180/349, 900, 905

(56) References Cited

U.S. PATENT DOCUMENTS

| | | | |
|---|---|---|---|
| 3,453,842 A | 7/1969 | Rethwisch | |
| 3,524,513 A | * 8/1970 | Williams | 280/124.111 |
| 4,053,171 A | * 10/1977 | Hyler | 280/124.112 |
| 5,271,632 A | 12/1993 | Glaser et al. | |
| 5,447,321 A | * 9/1995 | Hurlburt et al. | 280/124.113 |
| 5,538,264 A | 7/1996 | Brown et al. | |
| 5,597,172 A | 1/1997 | Maiwald et al. | |
| 5,879,016 A | 3/1999 | Altherr et al. | |
| 5,931,486 A | 8/1999 | Andreis | |
| 6,145,859 A | 11/2000 | Altherr et al. | |

FOREIGN PATENT DOCUMENTS

| | | | |
|---|---|---|---|
| DE | 2 031 910 | * | 1/1972 |
| EP | 0 997 328 A1 | * | 5/2000 |

* cited by examiner

*Primary Examiner*—Peter C. English

(57) ABSTRACT

A suspension linkage for an axle has hard mechanical oscillation stops that move relative to the vehicle frame as the axle travels vertically. The linkage uses thrust bearings to eliminate sideways movement of the axle that causes bounce steer. The linkage is a scissors linkage, having an upper link and a lower link joined together at a center pivot. The hard mechanical oscillation stops are carried by the linkage, as opposed to the vehicle frame, and thus move vertically with the axle.

7 Claims, 3 Drawing Sheets

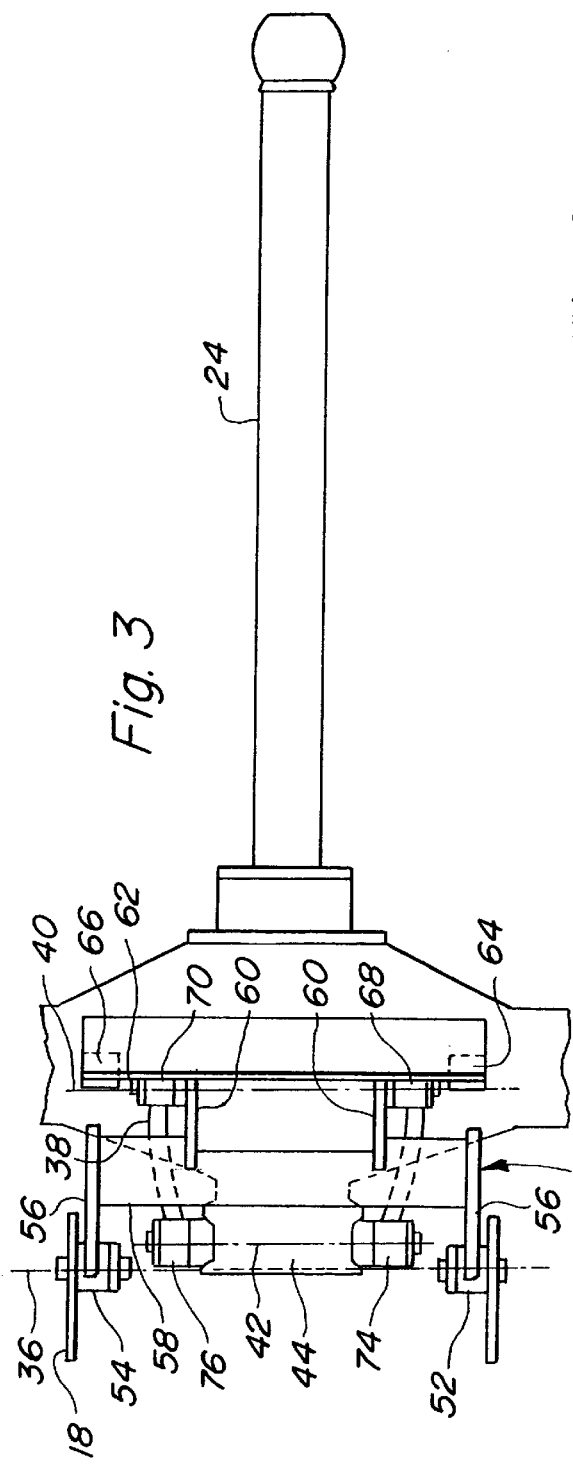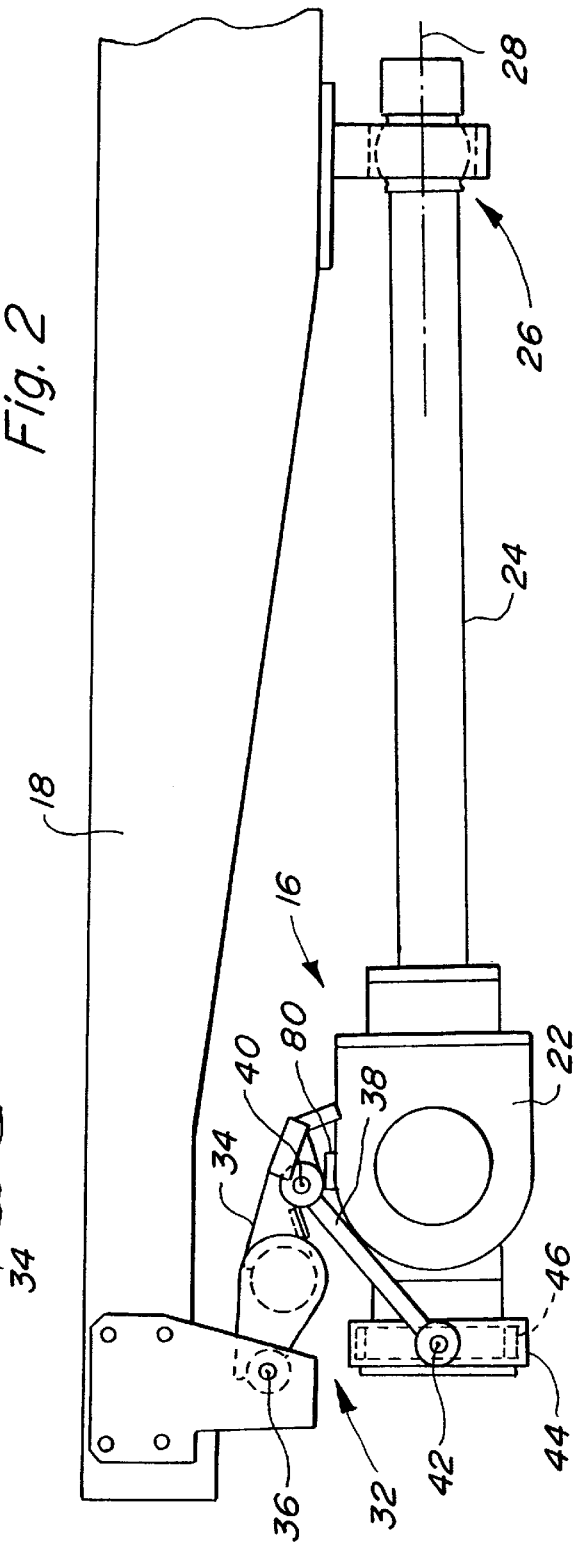

SUSPENDED AXLE WITH SIDE AND OSCILLATION CONTROL LINKAGE

FIELD OF THE INVENTION

The present invention relates to a control linkage for a suspended beam axle and in particular to a linkage that controls side to side motion of the axle as well as oscillation of the axle.

BACKGROUND OF THE INVENTION

When a beam axle is used on a vehicle, such as an agricultural tractor, it is allowed to oscillate, i.e. rotate about a longitudinal axis, in which the wheel on one side of the axle moves up while the wheel on the other side of the axle moves down. The amount of oscillation is controlled by oscillation stops on the vehicle frame and the axle body that engage one another when the maximum permitted oscillation is reached. When a beam axle is provided with a suspension system, the vertical position of the axle body relative to the frame changes. The vertical movement of the axle changes the amount of oscillation permitted before engagement of the hard stops. As a result, the hard oscillation stops are removed and external means are provided to limit the oscillation. Frequently chains have been used to provide an oscillation stop with a suspended axle. An example of this is provided in U.S. Pat. No. 5,879,016. Furthermore, when a suspended beam axle oscillates, it moves from side to side, causing a phenomenon known as "bounce steer."

SUMMARY OF THE INVENTION

The present invention provides a suspension linkage for an axle that provides a hard mechanical oscillation stop that moves relative to the vehicle frame as the axle travels vertically. The linkage further eliminates sideways movement of the axle that causes bounce steer. The linkage is a scissors linkage, having an upper link and a lower link joined together at a center pivot. The upper link is pivotally attached to the vehicle frame while the lower link is pivotally attached to the beam axle. The hard mechanical oscillation stops are carried by the linkage, as opposed to the vehicle frame, and thus move vertically with the axle.

Each pivotal coupling in the linkage includes thrust bearings to accommodate lateral loads. This prevents the lateral motion of the beam axle that causes bounce steer.

BRIEF DESCRIPTION OF THE DRAWINGS

FIG. 2 is a side elevational view of the axle and suspension coupled to the tractor frame of FIG. 1.

FIG. 3 is a top view of the suspension shown in FIG. 2.

DESCRIPTION OF THE PREFERRED EMBODIMENT

Figure 1:
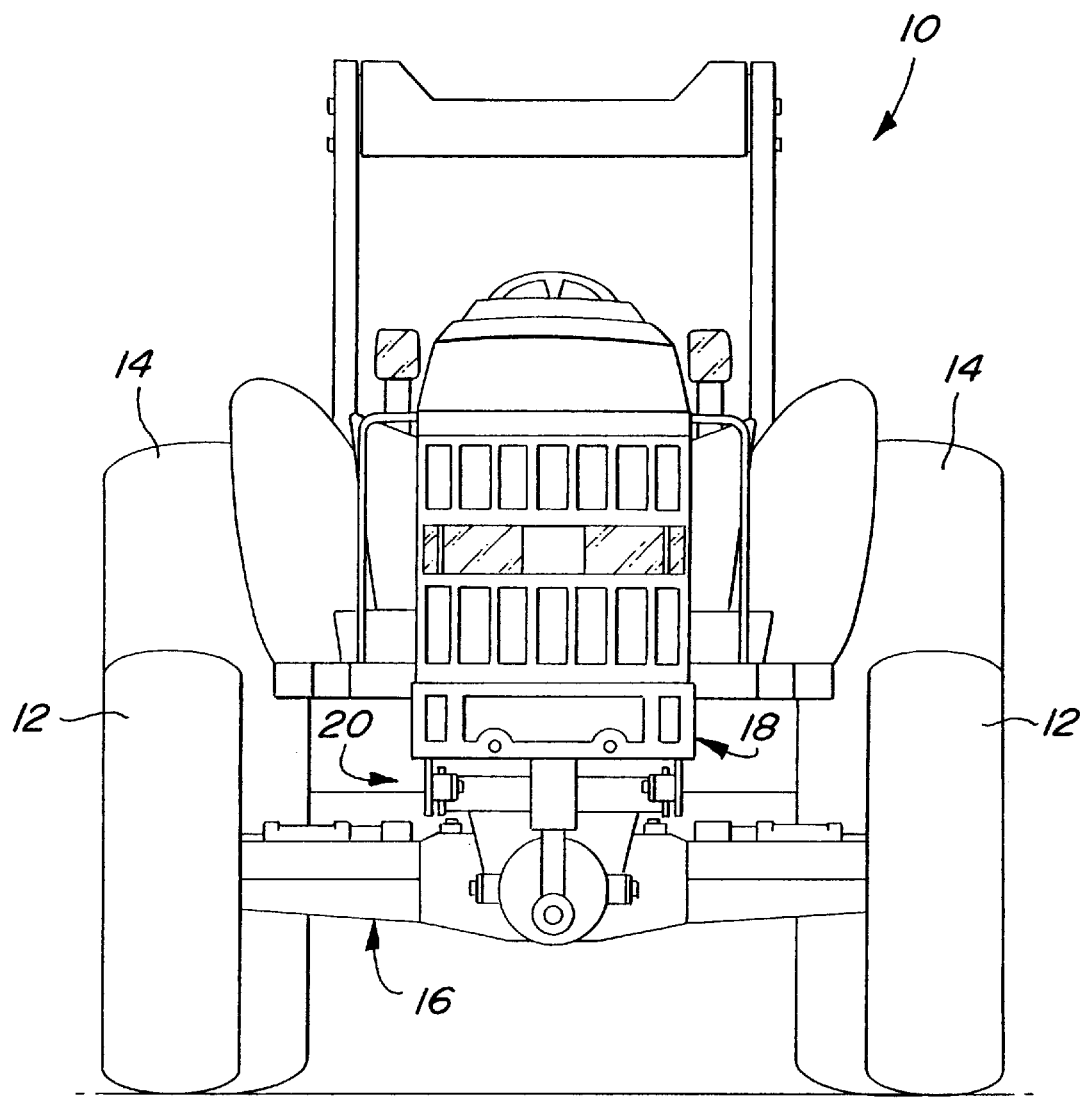
FIG. 1 is a front view of an agricultural tractor having the axle and suspension of the present invention.

With reference to FIG. 1, agricultural tractor 10 is shown having the axle and suspension of the present invention. The tractor 10 has a pair of front wheels and tires 12 and a pair of rear wheels and tires 14. The front wheels and tires are supported on a beam axle 16 connected to the frame 18 of the tractor by a suspension system 20.

The suspension components are shown in greater detail in FIGS. 2 and 3. The axle 16 includes an axle body 22. The suspension 20 includes a thrust arm 24 that extends rearward from the axle body 22 and is fastened to the frame 18 by a spherical bearing 26. The spherical bearing 26 allows the axle body to move up and down as well as rotate about a longitudinal axis 28.

A scissors linkage 32 extends vertically between the axle body 22 and tractor frame 18. The scissors linkage 32 includes an upper link 34 pivotally coupled to the frame 18 for rotation about an upper pivot axis 36. The upper link 34 is pivotally coupled to a lower link 38 at a center pivot axis 40. The lower link is pivotally coupled to the axle body for rotation at a lower pivot axis 42. The lower link 38 is coupled to the axle body through a trunnion 44 housing a trunnion bearing 46. The trunnion and trunnion bearing enable the axle body 22 to rotate relative to the linkage 32 about the longitudinal axis 28. The pivot connections of the scissors linkage 32 at the upper pivot axis 36, center pivot axis 40 and lower pivot axis 42 allows the axle body to move vertically while the trunnion 44, trunnion bearing 46 and the spherical bearing 26 allow the axle body to rotate, or oscillate about the longitudinal axis 28. A hydraulic cylinder 48, shown in FIGS. 1 and 4, extends between the axle body and the frame. The hydraulic cylinder 48 is part of a hydro-pneumatic spring system for dampening shock loads while supplying a constant down force on the axle.

With specific reference to FIG. 3, the upper link 34 is coupled to the frame 18 at left and right upper pivot bearings 52, 54. The upper link 34 includes brackets 56 that extend rearward from the upper pivot bearings to a torque tube 58. Brackets 60, welded to the torque tube 58, extend rearwardly therefrom and support a transverse pin 62 and left and right oscillation stops 64, 66. The transverse pin 62 supports left and right center bearings 68, 70, forming the center pivot about center pivot axis 40. The lower link 38 carries left and right lower pivot bearings 74, 76 coupled to the trunnion 44. The upper pivot bearings 52, 54, the center pivot bearings 68, 70 and the lower pivot bearings 74, 76 are thrust bearings that resist lateral loads on the axle body 22 to prevent the axle body from lateral motion, thereby preventing bounce steer.

Figure 4:
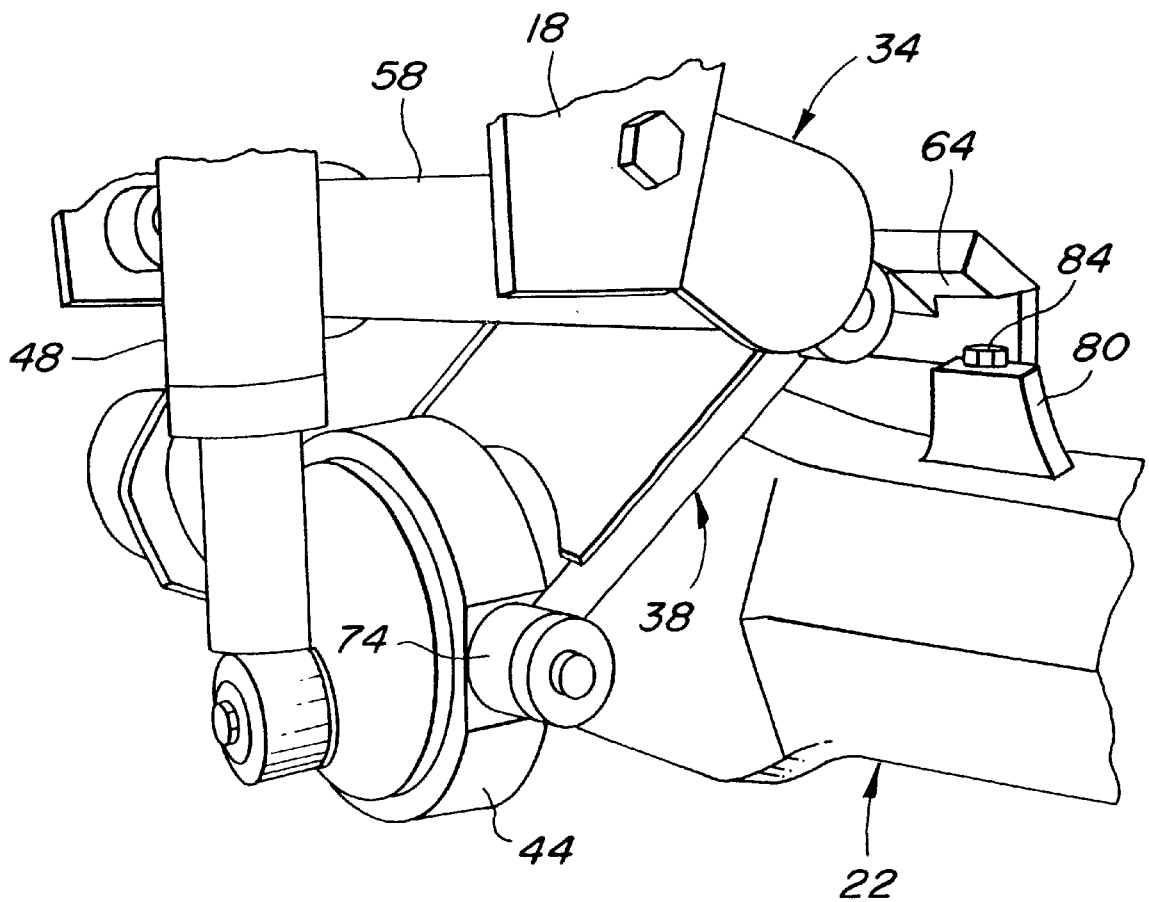
FIG. 4 is a perspective view of the suspension linkage and front axle.

With reference to FIG. 4, the axle body is formed with upstanding left and right oscillation stops 80, only one of which is shown, that engage the left and right oscillation stops 64, 66 on the upper link 34. The axle oscillation stops 80 are provided with bolts 84 forming adjustable stops and replaceable wear surfaces. Since the oscillation stops 64, 66 are on the upper link 34, these stops move vertically as the axle body moves vertically. The distance between the stops 80 the axle and the stops 64, 66 on the upper link, does not vary as much as the distance between the axle body and the frame as the axle body moves vertically.

The axle and suspension system of the present invention provides oscillation stops that move with the axle as the axle moves vertically. As such, hard mechanical oscillation stops work in a similar fashion as with a non-suspended axle. In addition, the scissors linkage provides resistance to lateral thrust loads to prevent the axle body from moving laterally. This eliminates bounce steer.

Having described the preferred embodiment, it will become apparent that various modifications can be made without departing from the scope of the invention as defined in the accompanying claims.

What is claimed is:

1. An axle and suspension system for suspending the axle from a frame of a vehicle, comprising:

an axle body;

a thrust arm extending in a longitudinal direction between the axle body and the frame;

a scissors linkage extending vertically between the axle body and the frame and being coupled to the axle body through a pivot bearing allowing oscillation of the axle body about a longitudinal axis;

a spring resiliently coupling the axle body to the frame;

left and right first oscillation stops on the linkage and left and right second oscillation stops on the axle body adapted to engage the left and right oscillation stops on the linkage respectively.

2. The axle and suspension system according to claim 1 wherein the linkage includes first and second links, the first link pivotally coupled to the frame at an upper pivot axis and pivotally coupled to the second link at a center pivot axis, the second link being pivotally coupled to the axle body at a lower pivot axis.

3. The axle and suspension system according to claim 2 wherein the left and right first oscillation stops on the linkage are on the first link.

4. The axle and suspension system according to claim 2 wherein:

the first link is coupled to the frame by left and right first pivot bearings;

the first and second links are coupled to one another by left and right center bearings;

the second link is coupled to the axle body through left and right lower pivot bearings; and the left and right first pivot bearings, the left and right center bearings and the left and right lower pivot bearings are thrust bearings whereby the linkage resists lateral loads on the axle body.

5. The axle and suspension system according to claim 2 wherein the first link includes a torque tube between its ends.

6. The axle and suspension system according to claim 2 further comprising a trunnion housing the pivot bearing and coupled between the second link and the axle body.

7. The axle and suspension system according to claim 1 wherein the spring includes a single hydraulic cylinder extending between the frame and the axle body.

* * * * *